United States Patent Office 3,172,786
Patented Mar. 9, 1965

3,172,786
COLORING OF ANODIZED ALUMINUM
Ben H. Kirby, Jr., Lock Haven, Pa., and Talfryn James, Fort Lauderdale, Fla., assignors to Koppers Company, Inc., a corporation of Delaware
No Drawing. Filed May 23, 1962, Ser. No. 196,896
3 Claims. (Cl. 148—6.1)

This invention relates to a method of coloring oxide-coated aluminum surfaces. In one specific aspect, it relates to a method of applying organic water-soluble and water-insoluble colorants to oxide-coated aluminum to produce a remarkably light fast coloring on the surface of the aluminum.

The term "aluminum" as used herein includes both the metal aluminum and aluminum base alloys. "Oxide-coated aluminum" refers to an aluminum having an oxide coating artifically formed on the surface thereof by any of various electrical and chemical methods. Conveniently, the aluminum may be made the anode in an electrolytic cell containing an electrolyte, such as sulfuric acid, oxalic acid or chromic acid. When external electrical energy is impressed upon the cell, an oxide coating is formed on the anode. In another method, the aluminum is immersed in a suitable solution, generally alkaline, and the oxide coating is formed by chemical reaction without the use of external electrical energy.

Workers in the art have long been in quest for a satisfactory method for producing a light fast coloring on oxide-coated aluminum surfaces, particularly anodized aluminum surfaces. It is conventional to color anodized aluminum by forming an aqueous dye solution using water-soluble dyes at a carefully controlled pH, and dyeing the anodized aluminum surface therewith. Unfortunately, this process is subject to numerous disadvantages; in particular, the dye solution must be buffered and the pH thereof must be carefully controlled within narrow limits which vary with the particular dyestuff used. Furthermore, the method is limited to water-soluble dyestuffs which, as a class, generally do not provide good light fast coloring on oxide-coated aluminum surfaces, which is required for many applications. It is well known that increasing the number of solubilizing groups, e.g. $SO_3H$, $SO_3Na$, and the like, of a dye molecule tends to decrease markedly the light fastness obtained. Using an aqueous dye solution the dyeing time generally takes about ten minutes and the temperature of the solution must be carefully controlled to avoid premature sealing of the oxide pores, which occurs at temperatures above about 70–80° C. in the presence of water. Salt formation in the aqueous dye solution is also a problem, since over a long period of time the build-up of various organic and inorganic salts causes a precipitation of the dye from the solution. Using the water-soluble dyestuffs applied from an aqueous bath, it has been impossible to produce a colored aluminum in a light fast pastel shade.

It has also been proposed to color oxide-coated aluminum using a dye solution comprising a small percentage of dye dissolved in acetone or alcohol. These solvents are only suitable for use with a small class of dyestuffs.

Unfortunately, none of the known methods are suitable for applying water-insoluble colors to oxide-coated aluminum. The use of colloidal aqueous dispersions of the water-insoluble colors is inadequate, since the dispersed color particles are too large to penetrate the oxide pores. Alcohol, acetone and similar solvents are unsuitable as a means to carry the color into the oxide pores because of their water miscibility; when the oxide pores are sealed in a hot aqueous bath, the solvent containing the color bleeds through the pores into the sealing bath. The resulting colored panel is streaked or uneven in appearance. Furthermore, the color thus obtained is not light fast.

Surprisingly, we have discovered a novel method of coloring oxide-coated aluminum with any water-soluble or water-insoluble organic colorant to provide aluminum in a variety of remarkably light fast colors.

It is, therefore, an object of the invention to provide a new method for coloring oxide-coated aluminum, particularly anodized aluminum, and to produce thereby colored aluminum surfaces for architectural, automotive and other decorative applications in a variety of light fast colors, including pastel shades thereof.

In accordance with the invention there is formed a coloring solution, consisting essentially of an organic water-insoluble colorant dissolved in a dye solution containing 5 to 100 percent by weight of the liquid portion thereof of a solvent for the dye selected from the group consisting of dimethylformamide, diethylformamide, dimethylacetamide, diethylacetamide and dimethylsulfoxide. The colorant is then applied to oxide-coated aluminum surfaces at a temperature ranging between about room temperature or somewhat lower, if desired, and the boiling point of the particular solvent used. The light fastness of the color thus produced on the aluminum may be considerably enhanced by protecting the colorant within the oxide pores from unnecessary exposure. Conveniently, this is accomplished by sealing the pores of the oxide coating by immersing the aluminum in a hot aqueous bath or by other conventional sealing treatments.

We have already indicated that the aluminum suitable for use in the invention includes both aluminum metal and commercial aluminum alloys which may contain, for example five percent or less of silicon, copper, magnesium, zinc, and other metals. The aluminum is oxide-coated, preferably by an anodic oxidation process conventional in the art. One excellent anodic oxidation process comprises making aluminum surface the anode in an electrolyte, comprising 12–18 percent by weight sulfuric acid in distilled water, at a current density of about 10–15 amperes per square foot at a temperature of about 70° F. for about one hour or less. The thickness of the aluminum oxide coating and the size and number of the pores can be carefully controlled as desired by varying the anodizing conditions.

After anodizing is completed it is preferable, although not essential, to pre-treat the anodized surfaces before coloring to remove any traces of the electrolyte that may be present. Conveniently, this may be accomplished by washing the anodized surfaces thoroughly in distilled water and then allowing them to soak in a 50 percent by weight aqueous solution of nitric acid for one to ten minutes at room temperature. After the nitric acid dip, the anodized surfaces are given a further rinse in distilled water, and thereafter dried. Whether or not the oxide-coated aluminum is pre-treated, a thorough drying is preferred, since superficial moisture may interfere with the absorption of color within the oxide pores. The oxide-coated surface can be thoroughly dried using an air blast or, alternatively, by immersing the surface in denatured alcohol following air drying.

The colorants useful in the present invention are the organic water-soluble or water-insoluble colorants. The term "colorant" is used herein to include dyestuffs, dyestuff intermediates, and organic pigments. Generally speaking, the colorants comprise the anthraquinone dyestuffs, the anthraquinoid dyestuff intermediates, the fused ring anthraquinoid dyestuffs, such as benzanthrone, the indigoid dyestuffs, the thioindigoid dyestuffs, the quinoline dyestuffs, the water-soluble and water-insoluble azo dyes, phthalocyanines, and the like. Specific colorants useful in the invention include, but are not limited to, those appearing hereunder in Table I.

TABLE I

| Colorant (Name or Structural Formula) | Old or New Color Index No. (if given) |
|---|---|
| 9,10-anthraquinone | |
| 1,4-diaminoanthraquinone | |
| 1,4,5,8-tetraaminoanthraquinone | |
| 1,4-dimethylaminoanthraquinone | |
| 1-methylamino-4-p-toluidinoanthraquinone | C.I. Solvent Blue 11. |
| 1-amino-4-anilino-5-acetaminoanthraquinone | |
| 1-amino-4-anilinoanthraquinone | |
| 1-amino-2-methyl-4-p-toluidinoanthraquinone | |
| 1,2-dihydroxyanthraquinone | C.I. 58000. |
| 1-hydroxy-4-acetaminoanthraquinone | |
| 1-amino-2,4-dihydroxyanthraquinone | |
| 1-amino-2-methoxy-4-hydroxyanthraquinone | |
| 1,8-dihydroxy-4,5-dimethoxyaminoanthraquinone | |
| 1-hydroxy-4-p-toluidinoanthraquinone | |
| 1,8-dihydroxy-4-anilino-5-nitroanthraquinone | |
| 1,5-dihydroxy-4-anilino-8-aminoanthraquinone | |
| 1-hydroxy-5-nitroanthraquinone | |
| 1,4-diamino-2,3-dichloroanthraquinone | |
| 1-amino-2-phenoxy-4-hydroxyanthraquinone | |
| (3'-hydroxy-4'-carboxyphenyl)-1-aminoanthraquinone | |
| 1,5-di-p-toluidinoanthraquinone | |
| 1-bromo-5-benzoylaminoanthraquinone | |
| 1,4-diethylamino-5,8-dihydroxyanthraquinone | |
| 1,4-bis(hydroxyethylamino)-5,8-dihydroxyanthraquinone | |
| 1,9-anthrapyridone | |
| 4-p-toluidino-1'-methyl-1,9-anthrapyridone | |
| 1,9-anthrapyrimidine | |
| 4-(p-chlorobenzoylamino)-1,9-anthrapyrimidine | C.I. 68400. |
| 1,9-anthrapyrimidone | |
| 1,2-pyrimidinoanthraquinone | |
| $CH_3CO-HN-\langle\rangle-N=N-\langle\rangle-OH, CH_3$ | C.I. Disperse Yellow 3. |
| $ClC_2H_2, nC_4H_9 \rangle N-\langle\rangle-C(H)=C(CN)-C(O)-OC_2H_5$ | C.I. Disperse Yellow 31. |
| $O_2N-\langle\rangle-N=N-\langle\rangle-NH-\langle\rangle$ | C.I. Disperse Orange 1. |
| $O_2N-\langle\rangle-N=N-\langle\rangle-NH_2$ | C.I. Disperse Orange 3. |
| $O_2N-\langle\rangle(Cl)-N=N-\langle\rangle(CH_3)-N(CH_2CH_2OH)_2$ | C.I. Disperse Red 5. |
| $O_2N-\langle\rangle(Cl)-N=N-\langle\rangle-N(C_2H_5)(C_2H_4OH)$ | C.I. Disperse Red 13. |
| $H_2N-\langle\rangle-N=N-\langle\rangle(CH_3, OCH_3)-NH_2$ | C.I. Disperse Black 2. |
| [quinoline-phthalimide structure] | C.I. Solvent Yellow 33. |

TABLE I—Continued

| Colorant (Name or Structural Formula) | Old or New Color Index No. (if given) |
|---|---|
| N-methyl-1-(N)-9-anthrapyridone-4-2'-dianthrimide | C.I. 68230. |
| [structure] | C.I. Vat Black 27. |
| [structure] | C.I. 65015. |
| [structure] | C.I. Vat Brown 1. |
| [structure] | C.I. Vat Red 13. |
| [structure] | C.I. Vat Orange 7. |
| [structure] | C.I. Vat Green 3. |

TABLE I—Continued
| Colorant (Name or Structural Formula) | Old or New Color Index No. (if given) |
|---|---|
| 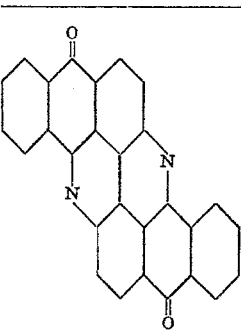 | C.I. Vat Yellow 1. |
| 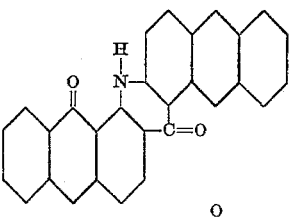 | C.I. Vat Red 35. |
| 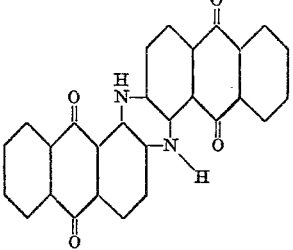 | C.I. Vat Blue 4. |
| 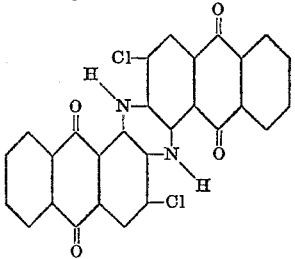 | C.I. Vat Blue 6. |
| 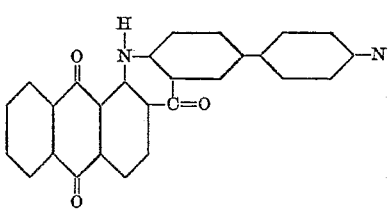 | C.I. Vat Brown 3. |
| 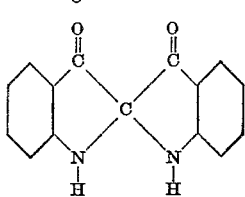 | C.I. Vat Blue 1. |
| 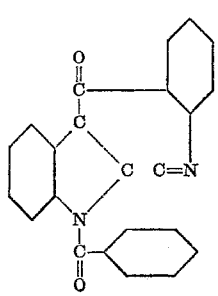 | C.I. 73100. |

TABLE I—Continued

| Colorant (Name or Structural Formula) | Old or New Color Index No. (if given) |
|---|---|
| 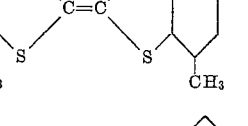 | C.I. Vat Violet 2. |
| 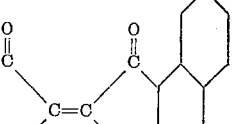 | C.I. Vat Brown 5. |
| 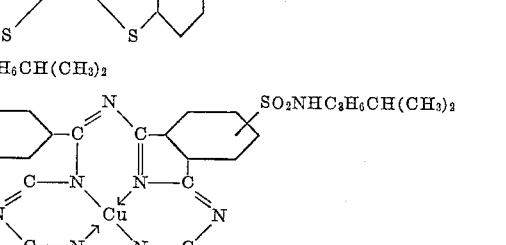 | C.I. Solvent Blue 25. |
| 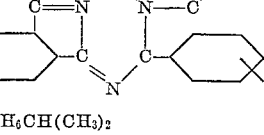 | C.I. Vat Red 45. |
| 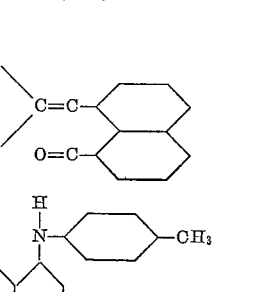 | C.I. Solvent Green 3. |

Other useful colorants include the chromium or cobalt complexes of the O,O'-dihydroxy or O-hydroxy-O'carboxy azo dyes. If desired, these dyes may contain water solubilizing groups; however, it is to be understood that the improved results from the process of the present invention are obtained when either water-insoluble or water-soluble dyes are employed. As noted above, any of the dyes normally used in coloring anodized aluminum may be employed. These include the chromium or cobalt complexes of mono- or poly-azo dyestuffs as well as the complexes of anthraquinone derivatives, triarylmethane dyestuffs, azines, thiazines or oxazines. Specific dyes which may be employed are those which are listed in Colour Index, second edition, under C. I. Nos. 14006, 13900A (Solvent Yellow 19), 18745 (Solvent Orange 5), 19351, 18736, 15685, 19115, 16055, 16260, 13425, 15711, 62105, 62085, 63010, 17045 and 34220; 3'-hydroxyquinophthalone, 1-hydroxy-4-anilino anthraquinone and 2,2', 4,4'-tetrahydroxybenzophenone.

The coloring solution is formed by dissolving a colorant of the above-indicated class in a solvent selected from the group consisting of dimethylformamide, diethylformamide, dimethylacetamide, diethylacetamide or dimethylsulfoxide. Mixtures of these compounds may be used. These solvents may constitute the entire liquid vehicle or, for reasons of economy, may be reduced to as little as five percent of the vehicle with other solvents. Thus, the solution of the dye may contain anywhere from 5 to 100 percent by weight of the liquid portion of a solvent which is either dimethylformamide, diethylformamide, dimethylacetamide, diethylacetamide or dimethylsulfoxide. Suitable other solvents which may be employed to dilute the liquid vehicle for the dye include alcohols, such as methanol, ethanol and butanol; ketones, such as acetone and methyl ethyl ketone; hydrocarbons, such as benzene, toluene and heptane; ethers, such as dioxane; glycols, such as ethylene glycol; polyglycols and their ethers, such as 2-ethoxyethanol and carbitol; basic compounds, such as pyridine and quinoline; and chlorohydrocarbons, such as carbon tetrachloride and chlorobenzene.

It is not necessary, for purposes of the invention, that a particular colorant be completely soluble in the selected solvent. If the solubility of the colorant in the solvent used is at least about 20 percent, the coloring solution, if the preferred amount of colorant is added thereto, will be sufficiently strong to color a panel in a light fast pastel shade.

The concentration of the dye solution is not critical. The depth of shade of the particular color applied may be varied from light to dark by decreasing or increasing the concentration of colorant in the solvent. At the lower concentrations, pastel shades are obtained. High concentrations of the dyes make possible the production of deep shades, particularly when water-insoluble dyes are employed. Solutions up to and including saturated solutions may be used. A practical minimum concentration of colorant required to obtain a light pastel shade is about 0.01 percent by weight. Excellent results are obtained using from about .05–2 percent by weight colorant. No particular advantage is seen in using a concentration of colorant greater than about 5 percent by weight, because of the excess usage of colorant involved.

It is advantageous, although not necessary, to protect the light fastness of the colored anodized aluminum by adding to the coloring solution a small amount, generally from about 0.1–0.5 percent by weight, based upon the weight of the solvent used, of an ultraviolet light screening agent, e.g. 5-chloro-2-hydroxybenzophenone, 2,4-dibenzoylresorcinol, phenylsalicylate, and the like. The ultraviolet light screening agent enters the pores of the oxide coating along with the colorant and helps to prevent fading when the colored aluminum is exposed to extreme conditions of sunlight and heat.

The colorant may be applied to the aluminum surface by immersing the oxide-coated aluminum in the coloring solution or, alternatively, by spraying, flowing, brushing or rolling. During the coloring step the coloring solution is maintained at a temperature between about 20° C. and the boiling point of the particular solvent used. It is preferable to control the temperature of the coloring solution between about 50–70° C. to avoid evaporation of the solvent and any streaking on the coated surface that may occur because of the rapid evaporation of solvent when the aluminum is removed from the coloring solution.

Adsorption of the colorant by the oxide-coated aluminum surface occurs almost immediately after the metal is contacted with the coloring solution. When coloring is accomplished by dipping, it is generally convenient to allow the coated aluminum to remain in the coloring solution for from five seconds to thirty minutes, preferably from one to ten minutes, to assure maximum and uniform penetration by the colorant into the aluminum oxide pores.

After the coloring step has been completed, the excess coloring solution is drained from the surface of the aluminum. The anodic pores should be thereafter substantially completely sealed to protect the colored panel against heat, ultraviolet light, abrasion and contamination, if the colored aluminum is to be used for exterior applications. The sealing technique may be accomplished by any of the method conventional to the anodized aluminum art, such as those described in Tosterud U.S. Patent No. 2,008,733, assigned to the Aluminum Company of America. These methods comprise immersing the coated aluminum for a short period of time in hot or boiling water or a hot or boiling metal salt solution, preferably a metal acetate solution. A particularly useful method of sealing involves immersing the colored oxide-coated aluminum in a 0.5 percent by weight solution of nickel acetate in water at a temperature of about 98° C. The pH of the nickel acetate bath is controlled between about 5.0 and 5.8 by the addition of acetic acid. The coated aluminum is allowed to remain in the sealing bath for between about five and ten minutes. Alternatively, the sealing bath may comprise 0.5 percent by weight nickel acetate, 0.1 percent by weight cobalt acetate, and 0.8 percent by weight boric acid dissolved in water. The boric acid serves to buffer the solution, thus making it easier to maintain the pH within the desired range. pH control is important in preventing sludge formation and avoiding conditions which would cause dissolution of the aluminum oxide coating.

After the colored anodized aluminum is removed from the sealing solution, it is rinsed with distilled water and thoroughly dried by methods hereinbefore described.

The dried, colored, oxide-coated aluminum may be polished by a light buffing action. The finished aluminum surface may be thereafter further protected by lacquering or waxing, if desired.

The colored aluminum panels, when prepared by the method of the invention, are remarkably light fast, even in faint pastel shades. Light fastness in an essential property for colored aluminum panels for architectural and outdoor usage, since such panels are continuously exposed to the heat and ultraviolet rays of the sun, and the fading normally caused thereby cannot be tolerated. Light fastness is conveniently measured by accelerated laboratory testing methods involving exposure of the colored surface to an artificial source of ultraviolet light. The "Atlas Carbon Arc Fade-O-Meter—Type FDAR," a commercially available apparatus of this type, is quite suitable for obtaining such measurements. The sample to be tested is placed in the "Fade-O-Meter" and exposed to the light source. An exposure time of 1,000 hours in the "Fade-O-Meter" with little or no change in the color of the sample being tested shows that the light fastness of the sample is excellent for most purposes. Colored panels produced by prior art methods cannot, in most cases, withstand such a prolonged exposure without objectionable fading, particularly when produced in light or pastel shades.

Our invention is further illustrated by the following examples:

*Example I*

A 1″ x 6″ panel of 99.3 percent aluminum was cleaned and degreased by immersion in an inhibited aqueous alkaline solution. The panel was then rinsed thoroughly with cold water and placed in a fifty percent by weight aqueous solution of nitric acid at room temperature for thirty seconds. After the nitric acid dip, the panel was again rinsed thoroughly with cold water. The aluminum panel was then anodized by making it the anode in a 15 percent by weight solution of chemically pure sulfuric acid in distilled water at 21° C. and treating it with an electric current, having a density of 12 amperes per square foot, for about one hour. The anodized panel was rinsed thoroughly in distilled water to remove all traces of acid and allowed to soak in a fifty percent by weight solution of nitric acid in distilled water for ten minutes. The panel was then thoroughly rinsed with distilled water and immersed in denatured alcohol to remove water from within the pores of the aluminum oxide coating.

A coloring solution was prepared by forming a one percent by weight solution of Brilliant Green J (C. I. Vat Green 1) in dimethylformamide. The anodized aluminum panel was immersed in the coloring solution at a temperature of 50–60° C. Coloring took place almost immediately, although the aluminum was allowed to remain in the solution for ten minutes to insure complete penetration of the dye into the pores of the aluminum oxide. The panel was then removed from the solution and allowed to drain by holding it vertically above the bath. After the excess coloring solution had drained from the panel, it was allowed to dry thoroughly in air.

After drying, the pores of the aluminum oxide were sealed by immersing the panel in a sealing bath, comprising 5.6 grams nickel acetate, 1 gram of cobalt acetate, and 8.4 grams boric acid dissolved in 1,000 grams of distilled water, at a temperature of 98° C. for five minutes. The pH of the sealing bath was maintained at between 5 and 5.5 by the addition of a dilute solution of acetic acid in distilled water. After sealing had been completed, the aluminum panel was rinsed in a bath of distilled water at a temperature of about 98–100° C. and thereafter allowed to air dry.

The colored panel was polished lightly with pumice powder and thereafter coated with a nitrocellulose lacquer.

The finished panel was bright golden olive green in color. It showed no appreciable change in shade after 100 hours exposure in a "Fade-O-Meter," and little change after further exposure.

*Example II*

The procedure of Example I was substantially repeated using a 2.0 percent by weight solution of Brilliant Green J (C.I. Vat Green 1) in dimethylformamide. The temperature of the coloring solution was maintained at 60° C. The finished panel had a very deep olive green color, which was especially light fast.

*Example III*

The procedure of Example I was substantially repeated using as a coloring solution a 1.0 percent by weight solution of Solubilized Vat Green I (C.I. 59826) in dimethylsulfoxide. A 1" x 6" panel of anodized aluminum alloy containing about five percent silicon as an alloying constituent was immersed in the coloring solution at a temperature at 60° C. The finished panel had a blue-green color of excellent light fastness.

*Example IV*

The procedure of Example III was repeated using Solubilized Vat Blue 6 (C.I. 69826) as the colorant. The finished panel had a light blue color of excellent light fastness.

*Example V*

The procedure of Example III was repeated using as a colorant Solubilized Vat Yellow 4 (C.I. 59101). The finished panel had a golden yellow color of excellent light fastness.

*Example VI*

The procedure of Example III was repeated using as a colorant Solubilized Vat Brown 1 (C.I. 70801). The finished panel had a deep brown color of excellent light fastness.

*Example VII*

The procedure of Example III was repeated using as a colorant Solubilized Vat Orange 5 (C.I. 73336). The finished panel had a medium pink color of excellent light fastness.

*Example VIII*

The procedure of Example III was repeated using as a colorant Solubilized Vat Green 3 (C.I. 69501). The finished panel had a gray-green color of excellent light fastness.

*Example IX*

The procedure of Example III was repeated using as a colorant Solubilized Vat Red 1 (C.I. 73361). The finished panel had a reddish-pink color of excellent light fastness.

*Example X*

The procedure of Example III was repeated using as a colorant Solubilized Vat Blue 5 (C.I. 73066). The finished panel had a deep blue color of excellent light fastness.

*Example XI*

The procedure of Example I was substantially repeated using as a coloring solution a 1 percent solution of Solubilized Vat Green 1 (C.I. 59826) in dimethylformamide. A 1" x 6" panel of aluminum silicon alloy used in Example III was immersed in the coloring solution at 60° C. for ten minutes. The finished panel had a pale green color of excellent light fastness. Similar results are obtained if either diethylformamide, dimethylacetamide or diethylacetamide is used as a solvent. Good results are also obtained if the solvent is used with a co-solvent, such as ethanol, methyl ethyl ketone, carbitol, chlorobenzene or linseed oil.

We have also found that the depth of shade of the colored aluminum may be greatly enhanced by a careful control of the drying conditions after the application of the dye solution, and before the sealing step. This enhancement of color is obtained by heating the aluminum containing absorbed colorant in an oven at a temperature of about 100 to 125° C. for a sufficient time to remove all traces of occluded solvent. This treatment completely eliminates any danger of the streaking occasioned by the bleeding of occluded solvent through the oxide pores during the sealing operation. The heating time depends upon the nature of the solvent used, although generally a five to ten minute period is sufficient.

We claim:

1. In the process of coloring anodized aluminum with a dye followed by sealing of the dye in the aluminum oxide coating, the improvement which comprises employing a dye solution containing from 5 to 100 percent by weight of the liquid portion thereof of a solvent for the dye, said solvent being a compound selected from the group consisting of dimethylformamide, diethylformamide, dimethylacetamide, diethylacetamide and dimethylsulfoxide.

2. Process according to claim 1 wherein the solvent is dimethylformamide.

3. Process according to claim 1 wherein the solvent is dimethylsulfoxide.

References Cited by the Examiner

UNITED STATES PATENTS 3,019,143   1/62   Dessauer _____ 148—6.1

RICHARD D. NEVIUS, *Primary Examiner.*

MARCUS U. LYONS, *Examiner.*